US011723837B2

(12) United States Patent
Sikora

(10) Patent No.: US 11,723,837 B2
(45) Date of Patent: *Aug. 15, 2023

(54) BACKUP METHODS AND SYSTEMS FOR SPA SYSTEM THERMAL MANAGEMENT

(71) Applicant: York Sikora, Ottawa (CA)

(72) Inventor: York Sikora, Ottawa (CA)

(*) Notice: Subject to any disclaimer, the term of this patent is extended or adjusted under 35 U.S.C. 154(b) by 0 days.

This patent is subject to a terminal disclaimer.

(21) Appl. No.: 17/815,048

(22) Filed: Jul. 26, 2022

(65) Prior Publication Data

US 2022/0354740 A1 Nov. 10, 2022

Related U.S. Application Data

(63) Continuation of application No. 16/498,113, filed as application No. PCT/CA2018/000152 on Aug. 16, 2018, now Pat. No. 11,446,204.

(60) Provisional application No. 62/546,088, filed on Aug. 16, 2017.

(51) Int. Cl.
*A61H 33/00* (2006.01)
*F24D 19/00* (2006.01)

(52) U.S. Cl.
CPC ..... *A61H 33/6005* (2013.01); *A61H 33/0091* (2013.01); *A61H 33/6068* (2013.01); *F24D 19/0095* (2013.01); *A61H 2201/0207* (2013.01); *A61H 2201/0242* (2013.01); *A61H 2201/5082* (2013.01); *A61H 2201/5097* (2013.01)

(58) Field of Classification Search
CPC .................................................. A61H 33/6005

USPC ....................................................... 4/545, 538
See application file for complete search history.

(56) References Cited

U.S. PATENT DOCUMENTS 5,559,720 A * 9/1996 Tompkins .......... A61H 33/0095
700/282
11,446,204 B2 * 9/2022 Sikora ..................... F16L 53/32
2019/0314243 A1* 10/2019 MacCallum ........ H04L 12/2809
2020/0030184 A1* 1/2020 Sikora ................ A61H 33/6005

FOREIGN PATENT DOCUMENTS

| CA | 2397892 A1 * | 7/2000 | ............. A61H 33/00 |
|----|--------------|--------|-------------------------|
| CA | 2959407 A1 | 1/2007 | |
| CA | 2696803 A1 | 9/2011 | |
| CA | 3012183 A1 | 7/2017 | |

* cited by examiner

*Primary Examiner* — Lori L Baker
(74) *Attorney, Agent, or Firm* — Rosenberg, Klein & Lee

(57) ABSTRACT

Spa systems may be used all year round and in colder weather provide an enjoyable experience for users through the cold ambient outdoor temperature and the heated water of the spa. However, failures in respect of the water circulating pump and/or heater of the spa system either mechanically, electrically or through overall power outages mean the water in the spa system and its pipework can easily freeze if ambient conditions are cold enough leading to cracks in the spa system or pipes and hence leaks when the water thaws requiring costly repair or replacement of components or entire systems. Accordingly, a freeze protection system is provided that uses a backup thermal management system discretely or in combination with other backup systems. These freeze protection systems offering backup when mechanical failures, electrical failures etc. arise by providing thermal input to the spa system through alternate thermal paths and providing alarms.

22 Claims, 10 Drawing Sheets

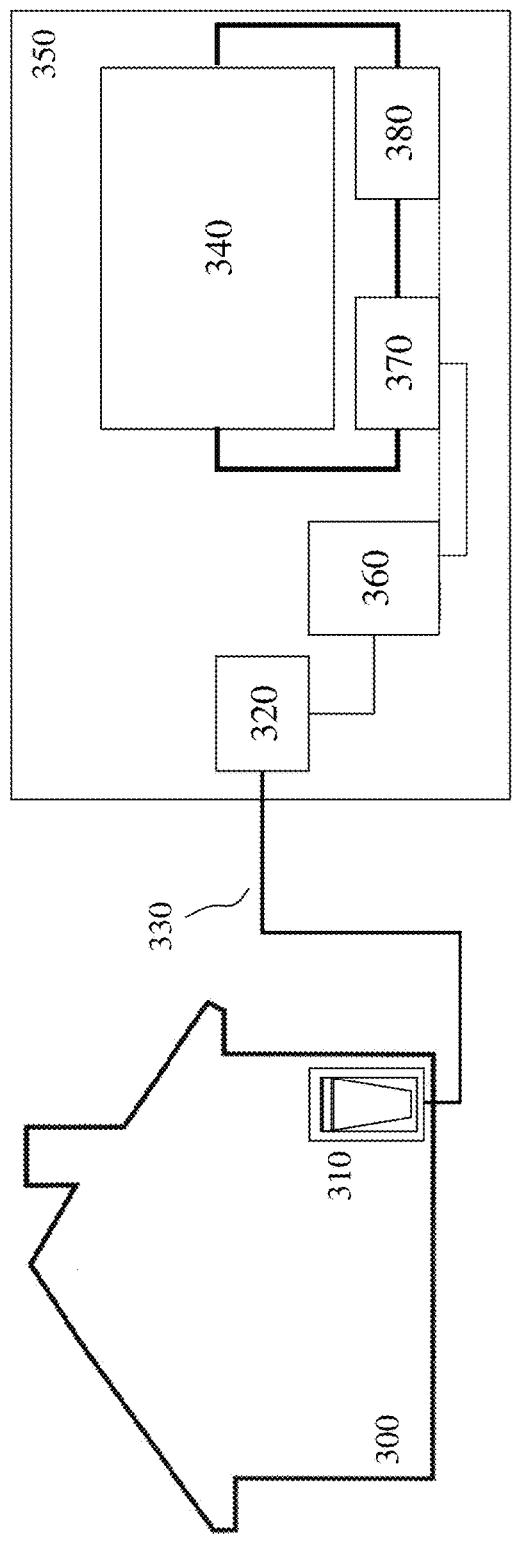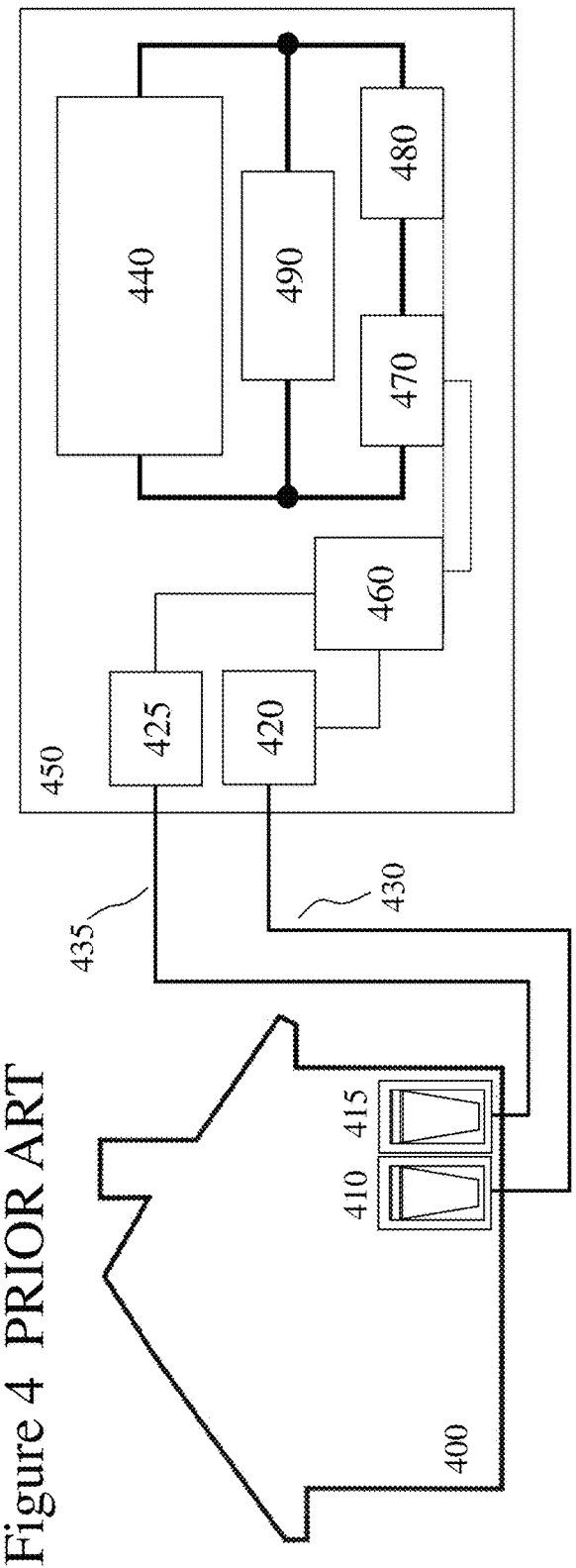
Figure 3 PRIOR ART
Figure 4 PRIOR ART

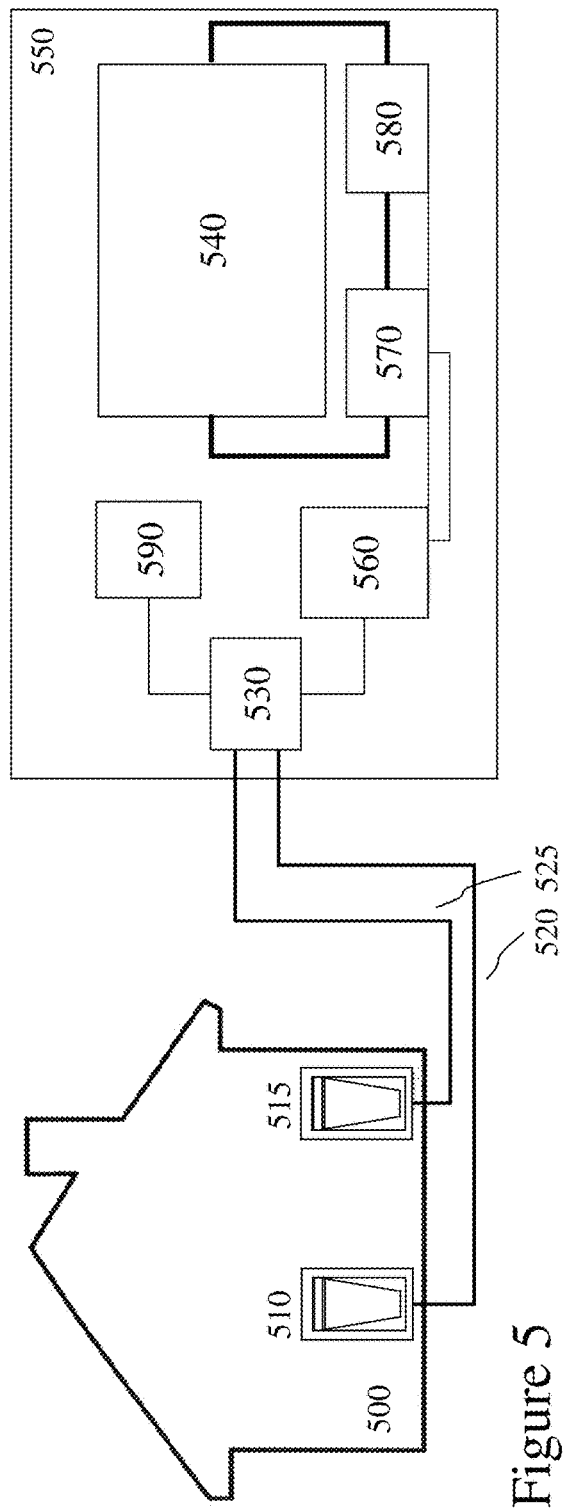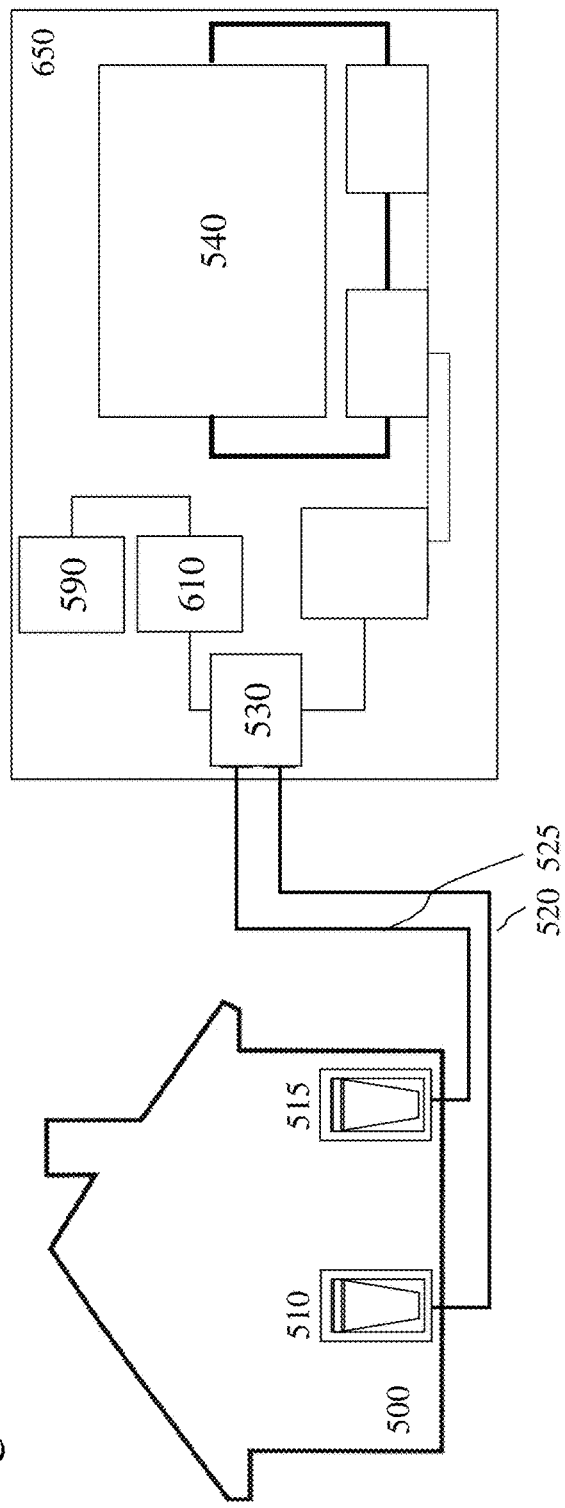
Figure 5
Figure 6

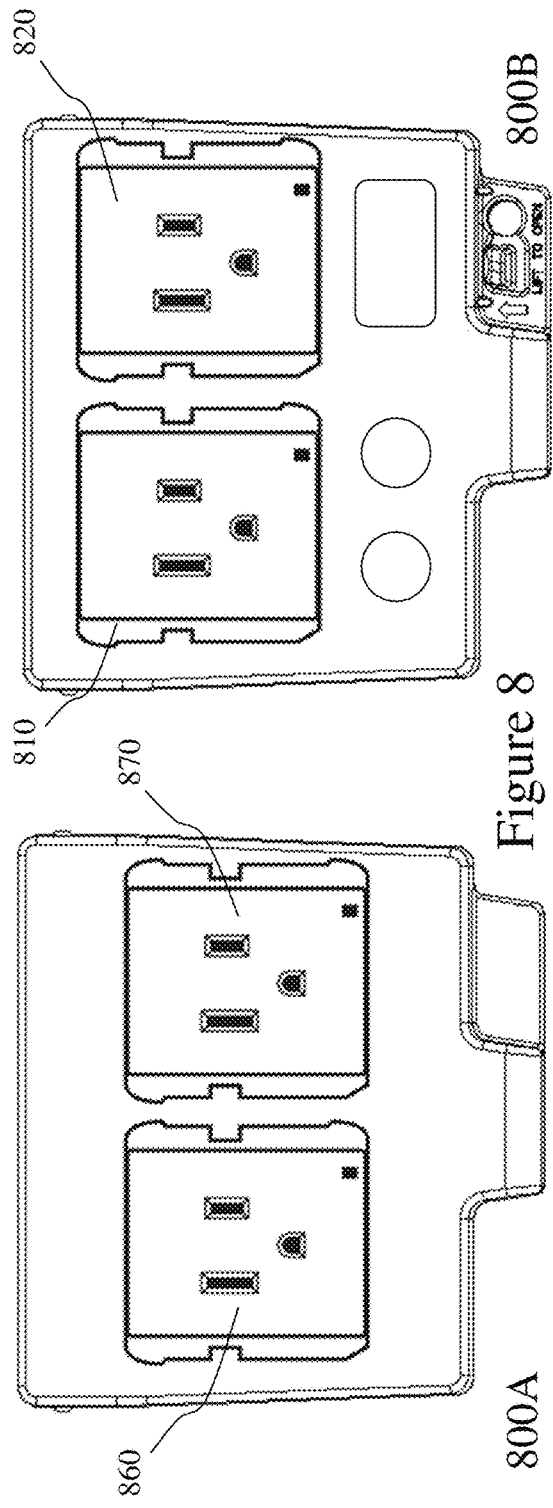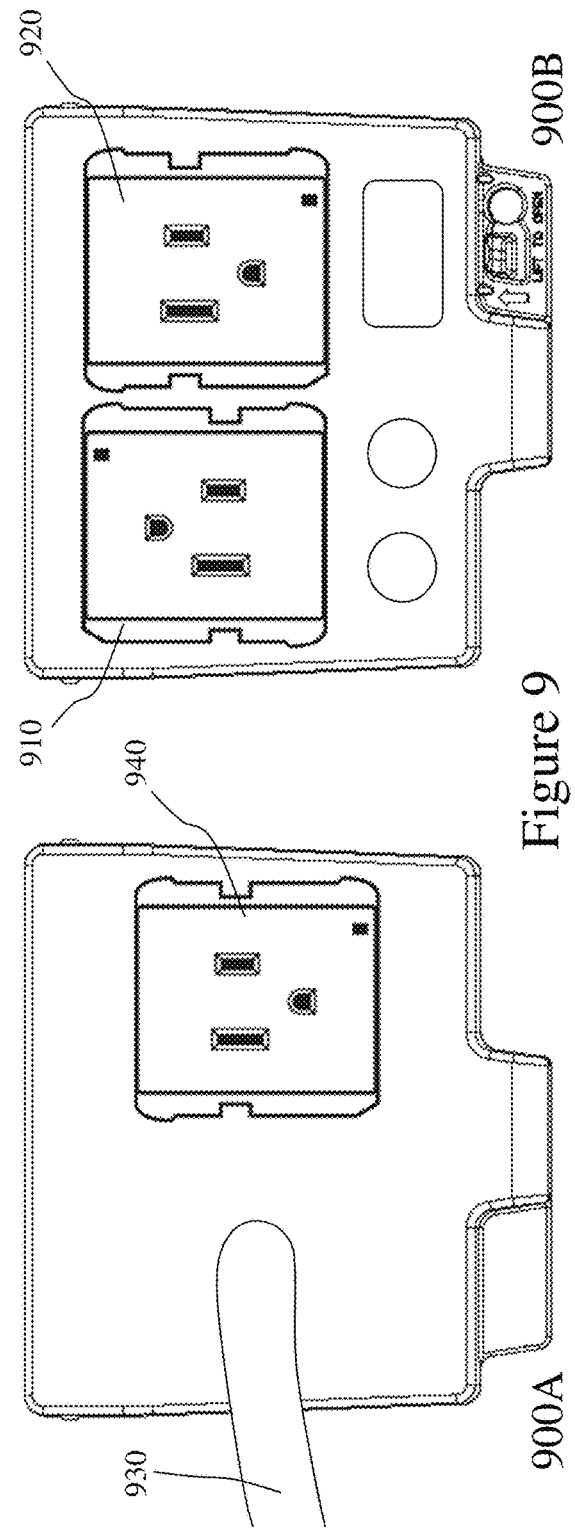

BACKUP METHODS AND SYSTEMS FOR SPA SYSTEM THERMAL MANAGEMENT

CROSS-REFERENCE TO RELATED APPLICATIONS

This application claims the benefit of priority as a continuation of U.S. patent application Ser. No. 16/498,113 filed 26 Sep. 2019; which itself claims the benefit of priority as a 371 national phase patent application of PCT/CA2018/000,152 filed 16 Aug. 2018; which itself claims the benefit of priority from U.S. Provisional Patent Application 62/546,088 filed 16 Aug. 2017; the entire contents of each being incorporated herein by reference.

FIELD OF THE INVENTION

This patent application relates to spa system and more particularly to backup methods and systems for spa system in environments where freezing is possible.

BACKGROUND OF THE INVENTION

Spa systems, also known as hot tubs or Jacuzzis (the manufacturers name becoming synonymous with such products irrespective of manufacturer), have become increasingly popular in the past 50 years since the first hot tubs built for families were introduced and for the past 25 years are increasingly part of a family backyard. Developments over this time have been made to the materials employed as well as the addition of hydrotherapy jets etc. and more recently the introduction of so-called swim spas. Whilst a spa system usually offers its users a steady temperature bath of water at around 100° F. to 104° F. (approximately 38° C. to 40° C.) a swim spa offers a combination of spa system with a swirling pool of hot water and a second operating mode of a net flow from one side to the other at a lower temperature, typically about 80° F. (approximately 27° C.), to provide resistance allowing a user to "swim" in the spa system.

Spa systems may be used all year round and during the colder weather seasons provide an enjoyable experience to users with the contrast of the cold ambient outdoor temperature and the heated water of the spa. However, a significant portion of the spa systems are installed in locations where temperatures get to freezing or below. If the spa system is at a summer cottage or similar location, then similar to residential swimming pools the spa system would be drained at the end of the season and re-filled at the start of the season as use during the period that the cottage is not used or used infrequently is unlikely. However, if the spa system is in a residential environment or will be used sporadically/periodically/frequently during the colder weather seasons then it is likely to be maintained in filled condition and kept in a "sleep" mode wherein the water is only heated during filter cycles. Some spa systems may provide limited low temperature protection and operate pumps at low speed for limited time to circulate the water through the system on the basis of expecting hot water in the tub and hence be drawn through the water system.

However, a known problem with spa systems in external environments, and occasionally indoor environments, is that if power is cut off to the water circulating pump and heater of the spa system then the water in the spa system and in the pipework connected thereto can easily freeze if ambient conditions are cold enough, and the expansion of the water as it freezes can cause cracks to form in the spa system or pipes, which can lead to leaks when the water thaws and can require costly or time consuming repair or replacement of components or entire systems.

However, even where power is not cut off a failure in the water circulating pump and/or heater will similarly not prevent the water cooling and freezing if ambient conditions are cold enough. Accordingly, it is desirable to provide methods and systems for freeze protection for spa systems using a backup thermal management system and/or backup systems.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to mitigate limitations within the prior art relating to spa system and more particularly to backup methods and systems for spa system in environments where freezing is possible.

In accordance with an embodiment of the invention there is provided a system for freeze protection of a spa system having a spa tub and a shell supporting the spa tub comprising: a mains power interface;
  a forced air heater coupled to the mains power interface disposed to allow hot air to be blown into a cavity between the shell of spa system and the bottom of the spa tub; and
  a temperature control for turning on the forced air heater when the thermostat establishes that the temperature of at least one of the air within the cavity between the shell of spa system and the bottom of the spa tub and the water within the spa system has dropped below a predetermined threshold.

In accordance with an embodiment of the invention there is provided a device comprising:
  an outer case for mounting the device to a shell of a spa system comprising the shell and a spa tub supported by the shell;
  a first mains power interface for coupling to a first mains power source to provide power to a forced air heater coupled to cavity disposed between the shell and the spa tub;
  a second mains power interface for coupling to a second mains power source to provide power to a spa pack for the spa system to provide normal operation of the spa system; and
  at least one of:
    a visual indication means to display to a user at least one a status of the second mains power interface and a status of the forced air heater; and
    an interface supporting communications to a communications network for sending messages relating to at least one a status of the second mains power interface and a status of the forced air heater to a remote user upon an electronic device also connected to the communications network.

In accordance with an embodiment of the invention there is provided a method comprising:
  providing a means of heating a cavity disposed between a spa tub of a spa system and a shell of the spa system supporting the spa tub; and
  providing a means of powering the means of heating when a monitored temperature of at least one of the air within cavity between the shell of spa system and the bottom of the spa tub and the water within the spa system has dropped below a predetermined threshold temperature.

In accordance with an embodiment of the invention there is provided a system for freeze protection of a spa system having a spa tub and a shell supporting the spa tub comprising: a mains power interface;
- a heater coupled to the mains power interface disposed to heat at least one of a predetermined portion of the spa tub and a pipe forming part of a circulatory circuit for the spa system that allows water to flow into and out of the spa tub; and
- a thermostat for turning on the heater when the thermostat establishes that the temperature of at least one of water within the circulatory circuit and the pipe forming part of a circulatory circuit is below a predetermined threshold.

In accordance with an embodiment of the invention there is provided a system for freeze protection freeze protection of a spa system having a spa tub and a shell supporting the spa tub comprising:
- a mains power interface coupled to a controller;
- a heater coupled to the mains power interface and the controller disposed to heat a predetermined portion of the spa system independent of the normal spa fluidic circuit;
- a temperature sensor disposed at a predetermined position within the spa system;
- a drain forming part of the spa system; wherein
- the controller when the temperature monitored by the temperature sensor drops below a first predetermined threshold enables the heater independent of a state of the normal spa fluidic circuit.

In accordance with an embodiment of the invention there is provided a system for freeze protection freeze protection of a spa system having a spa tub and a shell supporting the spa tub comprising:
- a mains power interface coupled to a controller;
- a heater coupled to the mains power interface and the controller disposed to heat a predetermined portion of the spa system independent of the normal spa fluidic circuit;
- a temperature sensor disposed at a predetermined position within the spa system;
- the controller when the temperature monitored by the temperature sensor is below a first predetermined threshold enables the heater and disables the normal spa fluidic circuit.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 3 depicts schematically a power and control configuration according to the prior art for typical domestic spa systems;

FIG. 4 depicts schematically a backup pump configuration according to the prior art of Miller (U.S. Pat. No. 8,621,678) for typical domestic spa systems;

FIG. 5 depicts a backup system for a typical domestic spa system according to an embodiment of the invention;

FIG. 6 depicts a backup system for a typical domestic spa system according to an embodiment of the invention;

FIG. 8 depicts a spa system power interface according to an embodiment of the invention;

FIG. 9 depicts a spa system power interface according to an embodiment of the invention;

DETAILED DESCRIPTION

Figure 1:
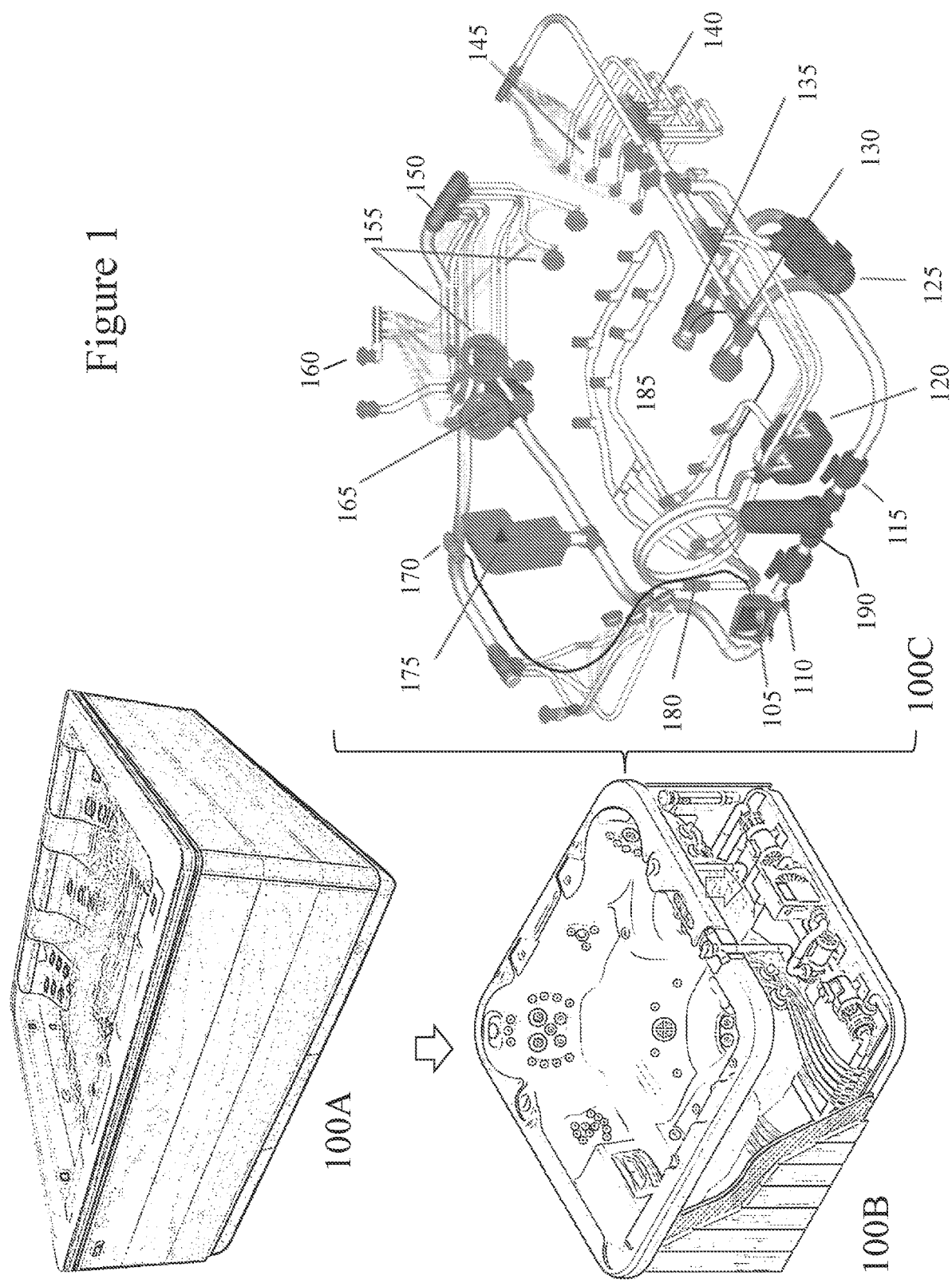
FIG. 1 depicts a typical domestic spa system as sold commercially by retailers and original equipment manufacturers (OEMs) today.

The present invention is directed to spa system and more particularly to backup methods and systems for spa system in environments where freezing is possible.

The ensuing description provides representative embodiment(s) only, and is not intended to limit the scope, applicability or configuration of the disclosure. Rather, the ensuing description of the embodiment(s) will provide those skilled in the art with an enabling description for implementing an embodiment or embodiments of the invention. It being understood that various changes can be made in the function and arrangement of elements without departing from the spirit and scope as set forth in the appended claims. Accordingly, an embodiment is an example or implementation of the inventions and not the sole implementation. Various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention can also be implemented in a single embodiment or any combination of embodiments.

Reference in the specification to "one embodiment", "an embodiment", "some embodiments" or "other embodiments" means that a particular feature, structure, or characteristic described in connection with the embodiments is included in at least one embodiment, but not necessarily all embodiments, of the inventions. The phraseology and terminology employed herein is not to be construed as limiting but is for descriptive purpose only. It is to be understood that where the claims or specification refer to "a" or "an" element, such reference is not to be construed as there being only one of that element. It is to be understood that where the specification states that a component feature, structure, or characteristic "may", "might", "can" or "could" be included, that particular component, feature, structure, or characteristic is not required to be included.

Reference to terms such as "left", "right", "top", "bottom", "front" and "back" are intended for use in respect to the orientation of the particular feature, structure, or element within the figures depicting embodiments of the invention. It would be evident that such directional terminology with respect to the actual use of a device has no specific meaning as the device can be employed in a multiplicity of orientations by the user or users.

Reference to terms "including", "comprising", "consisting" and grammatical variants thereof do not preclude the addition of one or more components, features, steps, integers or groups thereof and that the terms are not to be construed as specifying components, features, steps or integers. Likewise, the phrase "consisting essentially of", and grammatical variants thereof, when used herein is not to be construed as excluding additional components, steps, features integers or groups thereof but rather that the additional features, integers, steps, components or groups thereof do not materially alter the basic and novel characteristics of the claimed composition, device or method. If the specification or claims refer to "an additional" element, that does not preclude there being more than one of the additional element.

"Mains" as used herein and throughout this disclosure, refers to "mains electricity," this being the general-purpose alternating-current (AC) electric power supply delivered to homes and businesses. The two principal properties of the mains electrical power supply, voltage and frequency, differ between regions. A voltage of (nominally) 230 V and a frequency of 50 Hz is used in Europe, most of Africa, most of Asia, much of South America and Australia. In North America, the most common combination is 120 V and a frequency of 60 Hz. Other voltages exist, and some countries may have, for example, 230 V but 60 Hz. Electrical mains is distributed by cabling and normally terminates with a socket installed upon a wall or other solid portion of a building to which an electrical device is connected by means of a plug and cable. Some devices are permanently connected to the electrical mains via a circuit breaker/fuse such as cookers, freezers, refrigerators, washing machines, tumble driers etc. Other devices are connected via plug-socket. Some electrical devices such as portable electronic devices (PEDs) may employ a plug-cable that has a plug at the end of the cable to connect/disconnect to the electrical mains at the device for portability. Such a cable may also typically include a power converter to convert the AC electrical mains to a direct current (DC) input to the PED. Plug and socket configurations vary by different regions and countries.

A "spa system" (also known as a hot tub or Jacuzzi) is a large tub or small pool full of heated water used for hydrotherapy, relaxation or pleasure and may include powerful jets as well as providing whirlpool functionality, bubble generation, or net water flow across the spa system to provide resistance to a user's motion such as swimming. A spa system is typically designed to be used by more than one person at a time and usually located outdoors, although they can be installed indoors.

A "spa tub" as used herein and throughout this disclosure, refers to a wide, open, deep, container with walls and a bottom within which the user(s) of the spa system sit, kneel, and/or lay. The geometry of the spa tub may be circular, elliptical, rectangular, square or another geometry whilst the walls and/or bottom of the spa tub may contain features including ledges, seats, spa jets, bubble generators, etc. Typically, a spa tub is formed from fiber glass although other materials may be employed. A spa tub may be a bath tub without spa jets etc., a spa, a hot tub, a Jacuzzi, swim spa, or a tub.

A "shell" as used herein and throughout this disclosure, refers to the external physical structure supporting the spa tub and providing an exterior casing providing a visually aesthetic exterior to the user whilst covering the pump, heater, piping, manifolds, auxiliary pumps, etc. forming the spa pack and plumbing within the spa system.

A "fitting" as used herein and throughout this disclosure, refers to any machine component, piping or tubing part that can attach or connect two or more parts. Such fittings may include, but not be limited to, a coupling, couplings, compression fitting, pipe fitting, piping fittings, plumbing fittings, plumbing fitting, electrical connector.

A "mounting" as used herein and throughout this disclosure, refers to part of a device, system, ancillary, etc. which is configured to support and/or attach another device, system, ancillary, components etc. to said part of the device, system, ancillary, component etc. A mounting typically supports demountable attachment of the parts but may be employed in permanent attachment to define the location of the point of attachment or support demountable attachment prior to permanent attachment.

A "fixing" or "attachment means" as used herein and throughout this disclosure, refers to component, device, or means employed to permanently or demountably attach a device, system, ancillary, components etc. to part of another device, system, ancillary, component etc. This may include, but not be limited to, depending upon whether permanent or demountable and the material(s) being joined fasteners, glues, resins, epoxies, cementing, welding, soldering, brazing, pressure differentials, magnets, clamps, clips, ties, supports, physical retention elements such as clips and crimps, and physical retention methods such as friction and interference fit. Fasteners may include, but not be limited to, bolts, nuts, washers, screws, threaded fasteners, rivets, nails, pins, hook-and-eye, and hook and loop.

A "demountable" connection as used herein and throughout this disclosure, refers to component, device, or means employed to permanently or demountably attach an electrical connection or fluidic connection on a device, system, ancillary, components etc. to another electrical connection or fluidic connection on another device, system, ancillary, component etc. Electrical "demountable" connections are typically formed by plug and socket arrangements in discrete, linear array, or two-dimensional (2D) array formats or discrete male-female threaded connectors typically employed for microwave and RF. Fluidic "demountable" connections typically are formed by male-female threaded connectors with O-ring, sealing ring or gasket seals.

A "fluid" as used herein refers to a liquid, a gas, a mixture of liquids or a mixture of gases.

A "portable electronic device" (PED) as used herein and throughout this disclosure, refers to a wireless device used for communications and other applications that requires a battery or other independent form of energy for power. This includes devices, but is not limited to, such as a cellular telephone, smartphone, personal digital assistant (PDA), portable computer, pager, portable multimedia player, portable gaming console, laptop computer, tablet computer, a wearable device and an electronic reader.

A "fixed electronic device" (FED) as used herein and throughout this disclosure, refers to a wireless and/or wired device used for communications and other applications that requires connection to a fixed interface to obtain power. This includes, but is not limited to, a laptop computer, a personal computer, a computer server, a kiosk, a gaming console, a digital set-top box, an analog set-top box, an Internet enabled appliance, an Internet enabled television, and a multimedia player.

A "user" as used herein may refer to, but is not limited to, an individual or group of individuals. This includes, but is not limited to, private individuals, employees of organizations and/or enterprises, members of community organizations, members of charity organizations, men and women. In its broadest sense the user may further include, but not be limited to, software systems, mechanical systems, robotic systems, android systems, etc. that may be characterised by an ability to exploit one or more embodiments of the invention. A user may be associated with biometric data which may be, but not limited to, monitored, acquired, stored, transmitted, processed and analysed either locally or remotely to the user. A user may also be associated through one or more accounts and/or profiles with one or more of a service provider, third party provider, enterprise, social network, social media etc. via a dashboard, web service, website, software plug-in, software application, and graphical user interface.

A "battery" (formally an electric battery) as used herein may refer to, but is not limited to, a device consisting of one or more electrochemical cells with external connections provided to power electrical devices such as PEDs and FEDs When a battery is supplying electric power, its positive terminal is the cathode and its negative terminal is the anode. A battery may be a primary battery which is designed to be used until exhausted of energy and then discarded or a secondary battery which can be recharged after a full or partial discharge allowing them to be used, recharged, and used again multiple times. Common types of primary batteries may include, but are not limited to, zinc-carbon and alkaline. Common types of secondary batteries may include, but are not limited to, lead-acid, valve regulated lead-acid (VRLA, such as gel batteries or absorbed glass mat batteries), nickel-cadmium (NiCd), nickel-zinc (NiZn), nickel metal hydride (NiMH), and lithium-ion (Li-ion).

Referring to FIG. 1 there are depicted first to third images 100A to 100C with respect to a typical domestic spa system as sold commercially by retailers and original equipment manufacturers (OEMs) today. First image 100A depicts the spa system as bought and installed for a user whilst second image 100B depicts the spa system with the lower frame and shell removed. Third image 100C shows the spa system with the tub itself now removed thereby showing the mechanical elements and fluidic assemblies. Accordingly, there are depicted the following elements:
Control system 105;
Piping 110;
3-way Valves 115
Blower 120;
Massage Pump 125;
Suction Inlet 130;
Lights 135;
Hoses 140;
Back Jets 145; and
Manifolds 150.
Also depicted are:
Massage Jets 155;
Air Controls 160;
Circulation Pump 165;
Control Panel (for user) 170;
Skimmer 175;
Check Valve 180;
Air Jets 185; and
Water Heater 190.

The powered components of a spa include a water heater 190, at least one pump (Circulation Pump 165) for circulating water through pipes interconnecting the Water Heater 190 and the tub, and a controller (Control System 105) operable to control the Circulation Pump 165 (and Massage Pump 125) and the Water Heater 190 in response to input from an owner, operator or user of the spa. Collectively, these components are often referred to as a spa pack. The spa pack is typically connected to a main electrical power source through a cable to a ground fault circuit interrupter (GFCI), which will disconnect electrical communication between the spa pack and the power source if a ground fault is detected in order to remove a potential electrocution hazard to the user(s). This is problematic during winter use of the spa, in that if the GFCI cuts off the power supply to the spa pack and the spa system is left unattended, the water can quickly freeze, especially in the circulation pipes, pump(s), heater, distribution manifold(s) and cause damage to the spa. Operating spas are sometimes left unattended for extended periods of time during the cold weather season, for example by cottage owners who transit back and forth between a rural cottage and an urban environment and leave their cottage spa running between visits during the winter season to prevent freezing. Should the GFCI trip in their absence, they will likely return to find their spa frozen when the next retreat to the cottage.

Alternatively, the mains power may fail as the GFCI may not trip but a circuit breaker at an internal mains distribution panel may trip removing power. In other scenarios the Water Heater 190 may fail, the Circulation Pump 190 stall or fail, or the piping/skimmer may be come blocked through debris if a cover is incorrectly applied or not applied at all. Of course, an inadvertent disconnection of the electrical cabling to the spa system may also occur in some circumstances as well as blown fuses, pumps seizing, heater failures, power surges etc.

Figure 2:
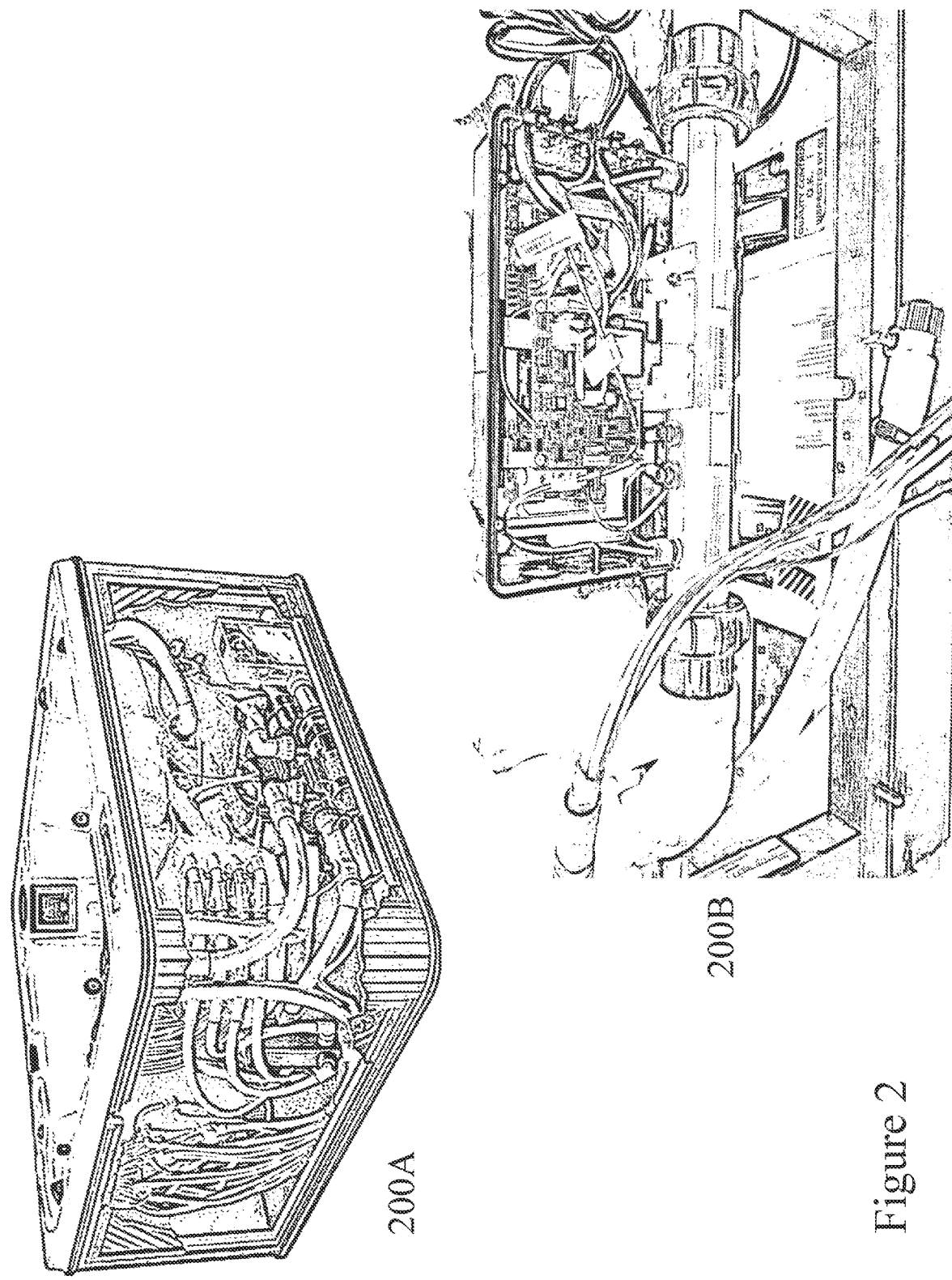
FIG. 2 depicts the physical construction of a typical domestic spa system as sold commercially by retailers and OEMs today.

Now referring to FIG. 2 there are depicted first and second images 200A and 200B with respect to the physical construction of a typical domestic spa system as sold commercially by retailers and OEMs today such as that described and depicted in respect of FIG. 1 and first to third image 100A to 100C respectively. As evident the spa pack, controller and the piping etc. are fitted within a shell that is not much larger than the actual tub itself so that additional space between the tub lining and the outer shell is not massive.

FIG. 3 depicts schematically a power and control configuration according to the prior art for typical domestic spa systems wherein a Spa system 350 comprising a Tub 340 is fluidically coupled to a Pump 370 and Heater 380. All ancillary elements such as distribution piping, jets, manifolds etc. are not depicted for clarity. The Pump 370 and Heater 380 are electrically connected to Controller 360 which is coupled via Cable 330 to GFCI 310. Within FIG. 3 a Weatherproof Electrical Socket (WES) 320 is depicted to which the cable 330 connects although in other embodiments of the invention the Cable 330 may connect directly to the Controller 360. As such Spa system 350 has no protection from freezing Now referring to FIG. 4 there is depicted schematically a backup pump configuration according to the prior art of Miller (U.S. Pat. No. 8,621,678) for typical domestic spa systems. Accordingly, a Spa system 450 comprising a Tub 440 is fluidically coupled to a Pump 470 and Heater 480. All ancillary elements such as distribution piping, jets, manifolds etc. are not depicted for clarity. The Pump 470 and Heater 480 are electrically connected to Controller 460 which is coupled via first Cable 430 to GFCI 410. However, there is now also disposed Auxiliary Pump 490 comprising an auxiliary pump and auxiliary heater (not depicted discretely for clarity).

Within FIG. 4 a first WES 420 is depicted to which the first Cable 430 connects although in other embodiments of the invention the Cable 430 may connect directly to the Controller 460. A second WES 420 is depicted also coupled to the Controller 460 which has a second Cable 435 connecting it to a second GCFI 415 although in other embodiments of the invention the Cable 430 may connect directly to the Controller 460. As taught by Miller in North America with single phase electrical supply at 110/120V the first electrical circuit of which first WES 420, first GCFI 410 and first Cable 430 form part is a 220/240V circuit (achieved by exploiting two phases of the main supply) which provides the electrical power to run the Water Heater 480 and Pup 470. The second electrical circuit of which second WES 425, second GCFI 415 and second Cable 435 form part is a 110/120V circuit. If the first electrical supply is active with the second electrical supply then the first electrical circuit supplies the electrical power required to the Controller 460, Pump 470 and Heater 480. However, failure of the first electrical supply through triggering the first GFCI 410 results in relays within the Spa system 450 being driven from an initial state (e.g., connected or not-connected) to another state (e.g., not-connected or connected) such that the second electrical circuit is now engaged. As the second electrical circuit is intended only to prevent freezing of the water within the Spa system 450 rather than heat it to the normal operating temperature with jets etc. then the Auxiliary Pump 490 does not require the same electrical requirements and hence is driven from a standard electrical mains supply at 110/120V.

However, the teaching of Miller does not address the instances that the Pump 470 fails or the Heater 480 fails etc. in that the determination of whether the Auxiliary Pump 490 is engaged or not is determined solely by the input electrical signals for the first and second electrical circuits. Accordingly, if the first GFCI 410 on the 220/240V power does not "trip" and disconnect the 220/240V signal then the relays within the electrical circuit maintain their normal conditions so that the bypass valves (not depicted for clarity) do not engage and hence there is no re-direction of the water flow from the Pump 470 and Heater 480 to the Auxiliary Pump 490 and thereafter to the Tub 440. Miller is absent any consideration of control from the Controller 460 or any other means than that of the electrical input supplies.

Accordingly, in order to establish a system with improved tolerance to a wider variety of fault mechanisms the inventor has established a different design methodology in respect of spa systems. Referring to FIG. 5 there is depicted a backup system for a typical domestic spa system according to an embodiment of the invention. Accordingly, as depicted a first GFCI 510 couples a first electrical cable 520 to a first part of an Electrical Connector 530 whilst a second GFCI 515 couples a second electrical cable 525 to a second part of the electrical connector 530. The first part of the Electrical Connector 530 is coupled to the Controller 560 which is coupled to Pump 570 and Heater 580 and accordingly functions in a manner similar to that depicted in respect of FIG. 4 and the prior art. The second part of the Electrical Connector 530 is coupled to Auxiliary Heater 590 which by virtue of the second electrical cable 525 and second GFCI is coupled to a different electrical supply than that powering the Pump 570 and Heater 580. Optionally, the first and second electrical circuits may be routed through different electrical connectors rather than a single Electrical Connector 530. The Auxiliary Heater 590 may be a forced air electrical heater which heats the region between the lower surface of the Tub 540 and the outer shell of the Spa system 550. In the event of a detection of a failure of the first electrical circuit within some embodiments of the invention and/or detection of a temperature within the spa system below a predetermined threshold temperate (set point temperature) then the second electrical circuit is engaged.

A low complexity approach is to employ a secondary circuit and/or Auxiliary Heater 590 which includes a thermostat (not depicted for clarity) set for, say 40° F. (approximately 5° C.) then the Auxiliary Heater 590 will turn on automatically when the detected temperature drops to below 40° F. Accordingly, the Auxiliary Heater 590 will operate irrespective of whether the first electrical circuit is live or dead and if live whether the Pump 570 and Heater 580 are functioning. Optionally, rather than an electrical thermostat providing a control signal to the Auxiliary Heater 590 may be coupled to the second electrical circuit via one or more mechanical temperature switches exploiting, for example, bimetallic elements to make the electrical connections or cause a conductive fluid to make the contact (e.g., mercury). Alternatively, a mechanical switch based upon mechanical expansion/contraction with temperature may be employed, such as a so-called "snap disc" or "snap-action" thermostat may be employed. Optionally, the first electrical circuit may be disconnected through mechanical temperature dependent switches such that the Heater 580 and/or Pump 570 are disconnected discretely or in combination with the Controller 560.

Optionally Electrical Connector 530 rather than a single housing with dual electrical interfaces may be a pair of discrete electrical connectors each being a discrete electrical interface (e.g., a plug or socket).

Now referring to FIG. 6 there is depicted a backup system for a typical domestic spa system according to an embodiment of the invention. As depicted the physical configuration is essentially identical to that depicted in FIG. 5 with the exception of the addition of a Battery Backup 610 disposed within the second electrical circuit prior to the Auxiliary Heater 590. Battery Backup 610 may, for example, be a primary battery designed to be replaced after use or a secondary battery designed to be recharged and to maintain charge through a so-called "trickle" charging process. In the event of a detection of a failure of the first electrical circuit within some embodiments of the invention and/or detection of a temperature within the spa system below a predetermined threshold temperate (set point temperature). Accordingly, considering a thermostat initiated powering of the Auxiliary Heater 590 then upon detection of a temperature below the set point temperature of the thermostat the thermostat couples the Auxiliary Heater 590 to the first electrical circuit which now includes the Battery Backup 610. Accordingly, if the second electrical circuit is active then the Auxiliary Heater 590 operates from the electrical mains but in the event of a failure to the second electrical circuit (e.g., a power failure (commonly referred to as a power cut) the Battery Backup 610 provides electrical power to the Auxiliary Heater 590.

It would be evident that systems exploiting Battery Backup 610 may provide protection even in the event of a triggering of a main circuit breaker associated with the spa system, multiple circuit breakers associated with the spa system, and the mains power feed to the spa system and/or its associated property etc. failing (e.g., power cut).

As the Auxiliary Heater 590 is intended to maintain a temperature sufficiently above freezing to protect the fluidic system, comprising Tub 540 and ancillary elements such as Piping 110, Jets Hoses 140, Back Jets 145, and Manifolds 150 as depicted in FIG. 1, rather than heat the water for use of the Spa system 550 the power requirements are significantly reduced. Further, the overall volume of air being heated is relatively small as evident from FIG. 2 and first and second images 200A and 200B. It would be evident that the addition of insulation to the exterior walls of the Spa system 550 may be beneficial to further reduce heat loss both initially and during operation of the Auxiliary Heater 590. Likewise, exploiting higher quality Spa system 550 coverings including those commonly referred to as "solar covers" or "solar blankets" to exploit available sunlight may further either delay the onset of powering the Auxiliary Heater 590 or the length of time the Auxiliary Heater 590 can operate.

Within other embodiments of the invention according to the design of the Spa system 550 the Auxiliary Heater 590 discretely or in combination with Battery Backup 610 may be a feature of the Spa system 550 when purchased by the user or alternatively added subsequently as an upgrade or retrofit option for the user. In either instance the Auxiliary Heater 590 and/or Battery Backup 610 may be designed in conjunction with the Spa system 550 to fit within the cavity of the Spa system 550 between the Tub 540 and the outer shell of the Spa system 550. Alternatively, the Auxiliary Heater 590 and/or Battery Backup 610 may be designed in conjunction with the Spa system 550 to be provided as an additional housing with a duct and/or opening between the additional housing and the cavity beneath the Tub 540. With a separate Auxiliary Heater 590 and an insulated ducted connection between the Auxiliary Heater 590 and the Spa system 550 options for powering the Auxiliary Heater 590 increase to include, for example, a propane gas based heater, a diesel generator based heater, petrol generator based heater, etc. The Auxiliary Heater 590 may be a forced air heater, an electrical element heater, a wound tape electrical heater, a heat lamp, an infrared heat lamp, etc. Alternatively, the Battery Backup 610 may be replaced with a generator to provide electrical power to the Auxiliary Heater 590 wherein the generator is engaged based upon a thermostat within the chamber of the Spa system 550 or within the fluidic system of the Spa system 550 for example. Such a generator may, for example, exploit a fuel such as oil, gasoline, or diesel.

Figure 7:
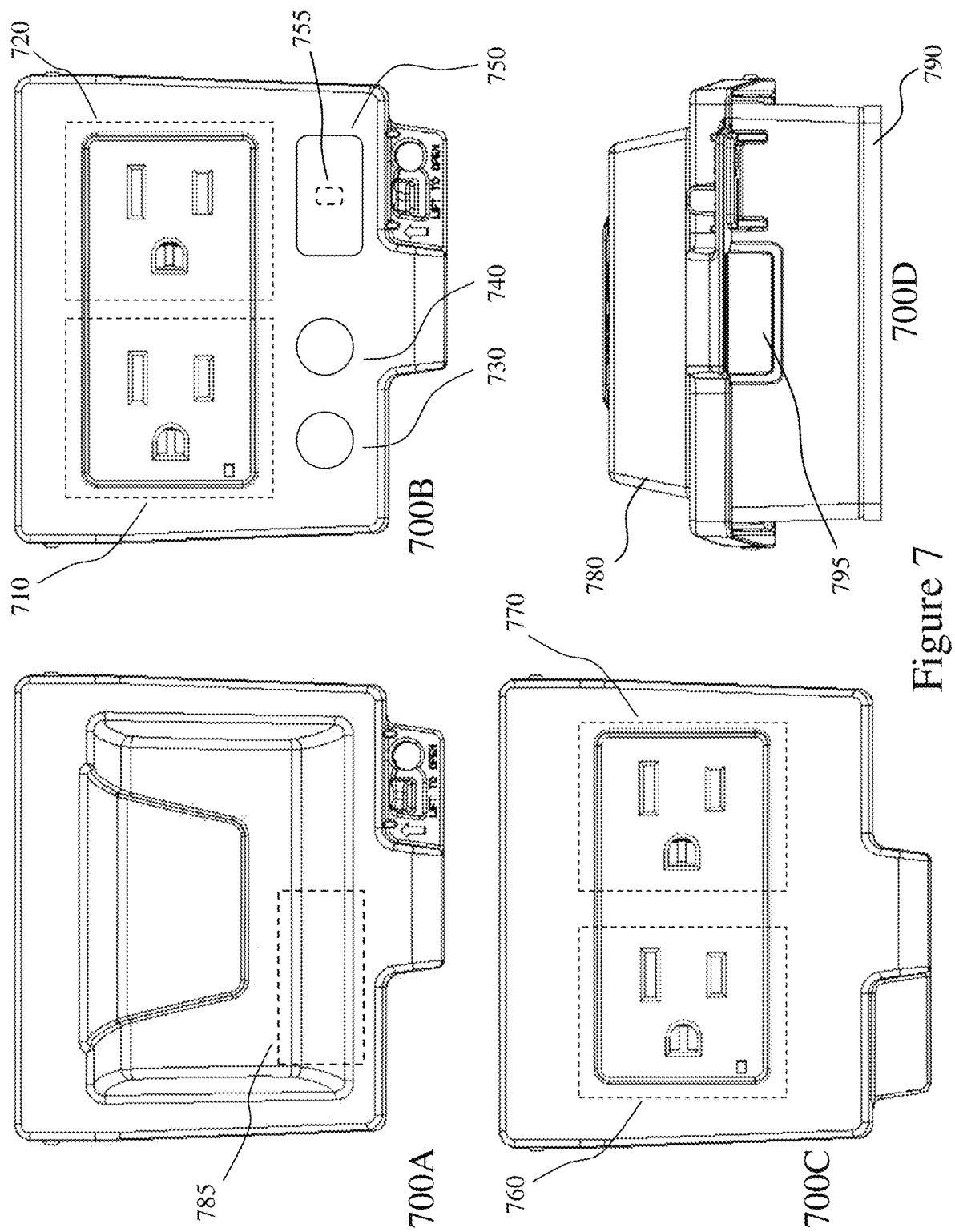
FIG. 7 depicts a spa system power interface according to an embodiment of the invention.

Now referring to FIG. 7 there is depicted an exemplary spa system power interface according to an embodiment of the invention based upon a configuration depicted within FIGS. 5 and 6 based upon a common housing for sockets for the first and second electrical circuits wherein these are routed from the GFCIs via cables with plugs at either end or are "hard" wired into the GFCIs. Accordingly, within first to fourth images 700A to 700D the Weatherproof Electrical Socket (WES) housing is depicted as:

First image 700A—front elevation with weatherproof cover attached (or closed);
Second image 700B—front elevation with weatherproof cover detached (or open and not shown for clarity);
Third image 700C—rear elevation; and
Fourth image 700D—bottom elevation with cover attached (or closed).

Accordingly, the Weatherproof Electrical Socket (WES) comprises a cover 780, body 790 and opening 795 which allows the cables to be routed into the WES and the cover 780 attached or closed according to the design of the WES. The cover 760 being clear over at least the region 785 as denoted within first image 700A in order for a user to see the first and second Lights 730 and 740 which are lit according to the state of the first and second electrical circuits and/or status of the spa system, for example. Also, within the front face of the body 790 are first and second Electrical Sockets 760 and 770 as compliant with local regulations in respect of the provisioning of electrical sockets/plugs for the electrical mains. Also, within the front face of the body 790 is a Wireless Interface Module 750 with optional Indicator 755.

Accordingly, according to an embodiment of the invention first Light 730 is lit (green for example) when the auxiliary heater is not on indicating to a user viewing the WES that the spa system is in normal "standby" or "sleep" mode maintaining the water temperature above the set point temperature. However, activation of the auxiliary heater for whatever reason triggers second Light 740 to be lit (red for example) and the first Light 730 to be turned off. Accordingly, a user viewing the WES would see a red light indicating an alarm condition that either the first electrical circuit has no power, e.g., the GFCI has been triggered, or that the pump and/or heater have failed. Optionally, first and second Lights 730 and 740 respectively may be a single light capable of being lit in two or more colours, e.g., green and red. If the first and second Lights 730 and 740 are powered solely by the second electric circuit, then failure of the second electric circuit results in both of the first and second Lights 730 and 740 being not lit indicating no power at all to a user viewing the WES.

It would be evident that other colours for the first and second Lights 730 and 740 respectively in isolation or combination may be employed. In instances where snow accumulation may be expected then an auxiliary light stand may be employed coupled to the WES which raises the height of another pair of lights to a predetermined height above the ground and/or the top of the spa system to improve visibility of the lights under snow accumulation.

The Wireless Interface Module (WLESS-IM) 750 with optional Indicator 755 may itself be an optional feature for the WES. The WIM 750 may be powered from the second electric circuit discretely, the first circuit discretely, or the first and second circuits in combination within alternate embodiments of the invention. The WLESS-IM 750 may operate according to one or more wireless standards selected from those comprising, but not limited to, IEEE 802.11, IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, and IMT-1000 which may or may not be routed through a router associated with the location of the spa system prior to accessing a communications network or global communications network. Optionally, a WLESS-IM may exploit an optical communications based wireless methodology rather than a microwave or radio-frequency based wireless methodology.

Alternatively, within other embodiments of the invention the WLESS-IM may be augmented with, combined with, or replaced by a WED-IM (not depicted within the Figures) which may operate according to one or more wired standards selected from those comprising, but not limited to, DSL, Dial-Up, DOCSIS, Ethernet, G.hn, ISDN, MoCA, PON, and Power line communication (PLC) which may or may not be routed through a router associated with the location of the spa system prior to accessing a communications network or global communications network.

The WLESS-IM (or WED-IM) may push status information to a cloud based service or services and therein to one or more PEDs/FEDs employing a software application. The software application (app) may provide continuous updates to the user(s) or it may only provide an update in the event of a change in condition such as the triggering of the auxiliary heater for example as well as the triggering of battery backup. Optionally, a cloud based service to which the WLESS-IM (or WED-IM) pushes updates may include an alarm monitoring service (to indicate an issue for which attention is required) or a spa system maintenance/service company top trigger an urgent service call. The WLESS-IM or WED-IM may establish communications via one of more communications networks including the World Wide Web or Internet.

Optionally, a WLESS-IM and/or WED-IM according to an embodiment of the invention may be coupled to a cloud based service or services and therein to one or more PEDs/FEDs employing a software application allowing a user to change one or settings of the system during normal operation, e.g. change set point temperature, place system to operating from standby mode, etc. as well as allow the user to monitor aspects of the system including the monitored temperature, alarm status etc.

Optionally, a WLESS-IM and/or WED-IM according to an embodiment of the invention may be coupled to a battery backup or other means of storing electrical energy, e.g., fuel cell, allowing the WLESS-IM and/or WED-IM to operate once all power has failed to the spa system allowing final status messaging to be sent.

Referring to FIG. 8 there are depicted first and second images 800A and 800B of a Weatherproof Electrical Socket (WES) providing a spa system power interface according to an embodiment of the invention. In contrast to the WES depicted in FIG. 7 discrete first and second electrical receptacles 810 and 820 are provided on the front face of the body and discrete third and fourth electrical receptacles 860 and 870 on the rear face of the body.

Now referring to FIG. 9 there are depicted first and second images 800A and 800B of a Weatherproof Electrical Socket (WES) providing a spa system power interface according to an embodiment of the invention. In contrast to the WES depicted in FIG. 7 but in common with the WES depicted in FIG. 8 discrete first and second electrical receptacles 910 and 920 are provided on the front face of the body. However, in contrast to both WES in FIGS. 7 and 8 only a single third electrical receptacle 940 is disposed on the rear face of the body for the auxiliary heater installation as upgrade/retrofit whilst the controller etc. are hard wired to the WES via cable 930.

Figure 10A:
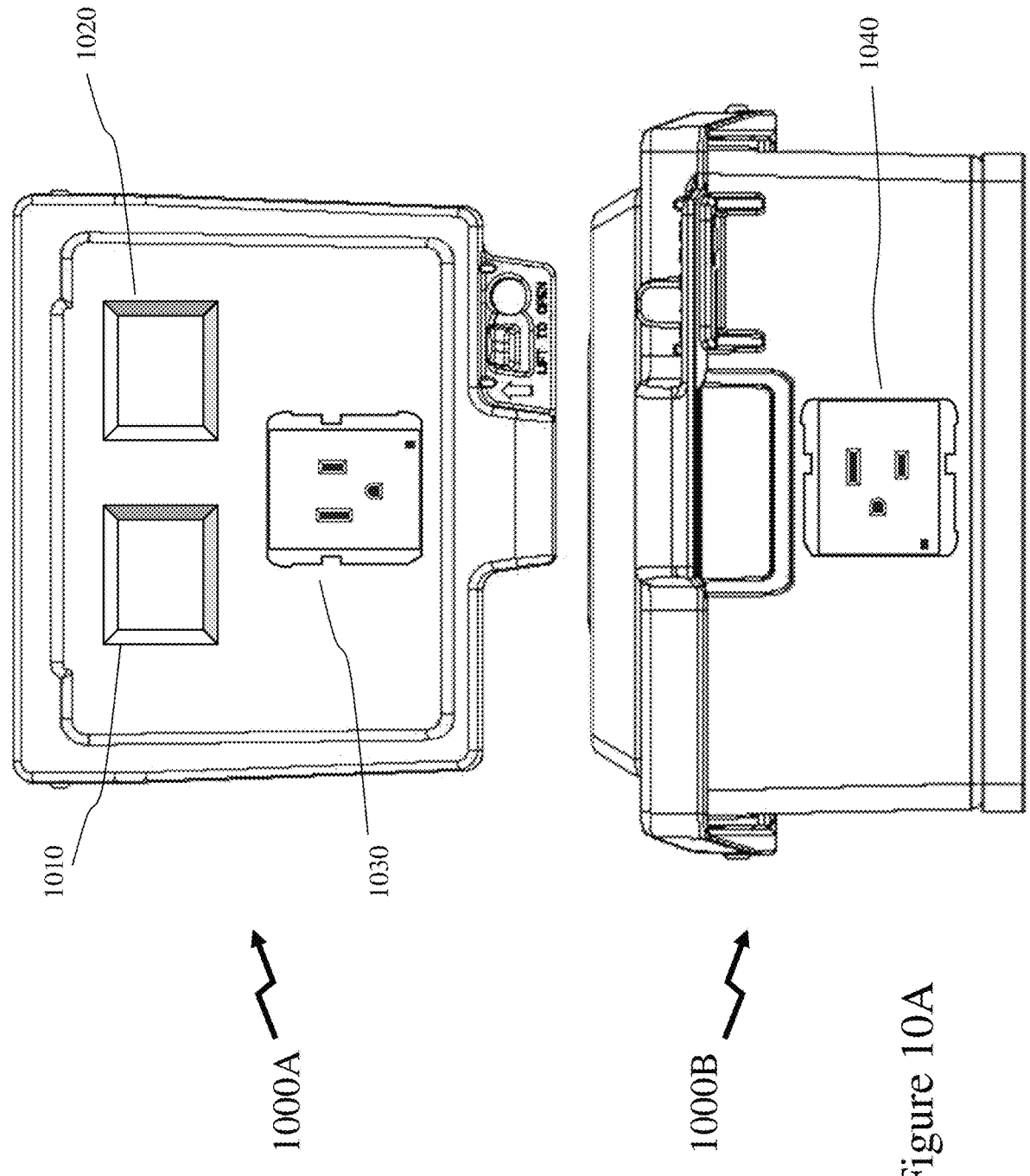
FIGS. 10A and 10B respectively depict spa system power interfaces according to an embodiment of the invention.

Now referring to FIG. 10A there are depicted first and second images 1000A and 1000B of a Weatherproof Electrical Socket (WES) providing a spa system power interface according to an embodiment of the invention. In this embodiment of the invention the WES is provided discretely from that relating to the first electric circuit and the normal pump/heater/control system of the spa system. Accordingly, the WES depicted in FIG. 10A may be an upgrade/retrofit installed discretely from another WES which provides the interface for the first electric circuit. As depicted in first image 1000A representing a front view with a protective cover removed (or open and not shown for clarity) the front panel comprises an electrical socket 1030 together with first and second lights 1010 and 1020. A second electrical socket 1040 is disposed on the bottom of the WES for connecting to the auxiliary heater. In this embodiment the WES may or may not include a wired and/or wireless interface.

Figure 10B:
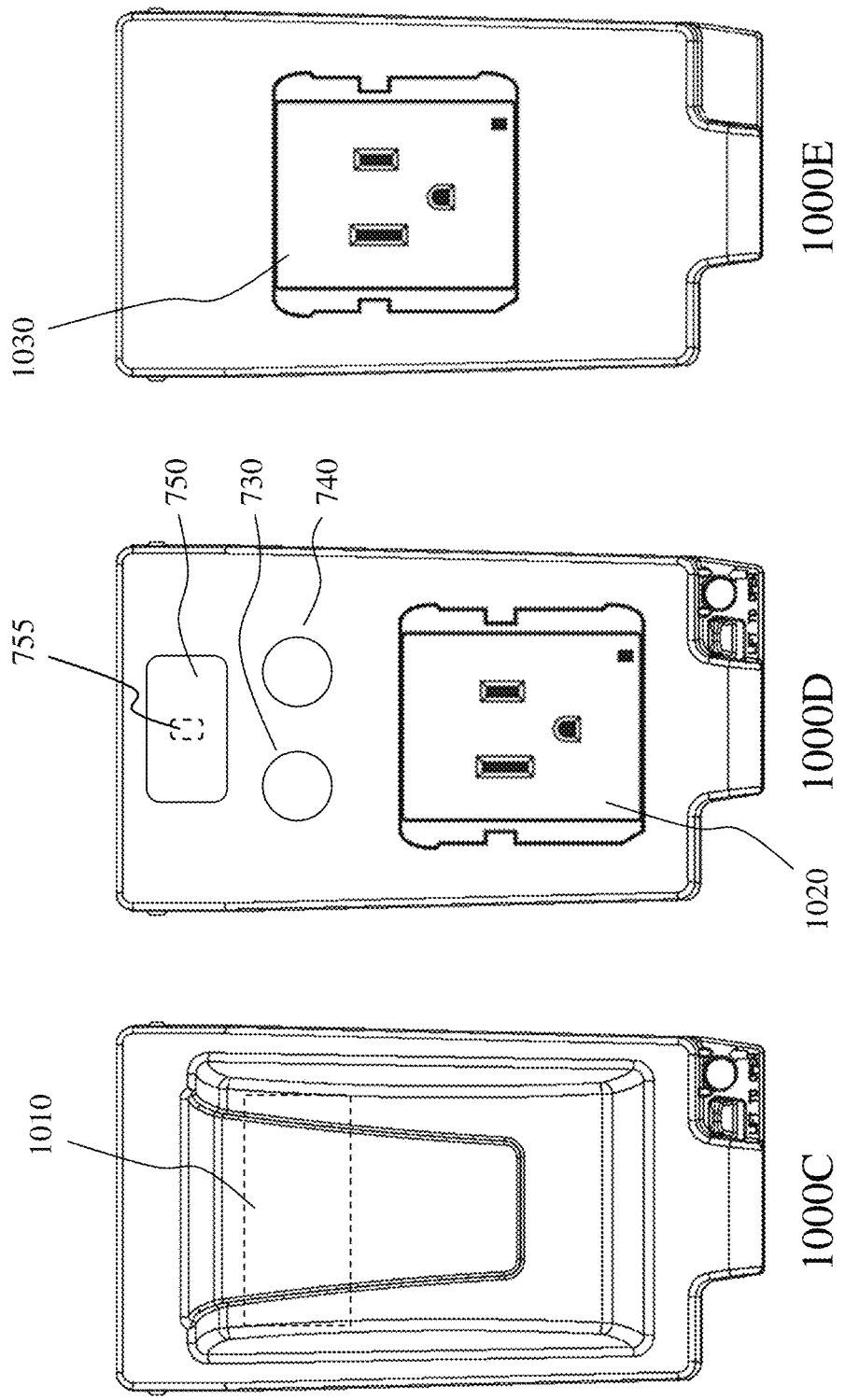

Now referring to FIG. 10B there are depicted first to third images 1000C to 1000E respectively of a Weatherproof Electrical Socket (WES) providing a spa system power interface according to an embodiment of the invention. In common with the embodiment of the invention depicted in FIG. 10A the WES is provided discretely from that relating to the first electric circuit and the normal pump/heater/control system of the spa system. As depicted in first to third images 1000C to 1000E respectively there are depicted, respectively, front elevation with cover attached (or closed), front elevation with cover detached (or open and not shown for clarity) and rear elevation. Accordingly, upon the front are disposed first electrical receptacle 1020 for the power cable plug for the second electric circuit, first and second Lights 730 and 740, and Wireless Interface Module 750 with optional Indicator 755. Disposed within the rear face is second receptacle 1030 for connecting the auxiliary heater directly or via battery backup. Within the front cover at least a portion 1010 is made clear (transparent) to allow the first and second Lights 730 and 740 to be visible to a user remote from the spa system. Optionally, these lights are on the exterior surface of the WES. Optionally, whilst a rectangular and/or square WES housing have been discussed and depicted in respect of FIGS. 7 to 10B supra it would be evident that other geometries may be employed including, but not limited to, circular. A circular geometry may be employed for insertion within an opening cut with a circular blade into a side wall of the shell of the spa system.

It would be evident that whilst embodiments of the invention are presented with a particular design of WES that the embodiments of the invention can be implemented with a range of weatherproof electrical sockets with or without covers and with vary electrical receptacles and/or wired interfaces according to the allowed configurations for electrical mains within the location the spa system is deployed. Where regulations support 2 pin or 2 pin+ground (3 pin) connections it is anticipated most deployments will be 3 pin to include ground connection. Within other embodiments of the invention rather than a socket being disposed within a WES for mating to a plug then plug may be employed to which a socket is mounted. Within other embodiments of the invention a WES may be a cabled from the WES to the electrical device(s) within the spa system cavity and/or cabled externally wherein the WES provides the visible indicators and housing for the wireless and/or wired communications interfaces.

It would be further evident that embodiments of the invention exploiting a WES may exploit a WES inserted into and attached to the shell of the spa system by one or more mounting means and/or fittings or the WES may be mounted to the shell of the spa system by one or more mounting means and/or fittings.

Whilst embodiments of the WES have been depicted with the mains electrical input to the WES on the front face and the output electrical connection(s) to the auxiliary heater, spa pack etc. on the rear face it would be evident that the output electrical connection(s) may be disposed upon one of the other sides of the WES such as the upper surface, lower surface, left side or right side with a rectangular WES or upon a face of the WES in the event of other geometries such as triangular, hexagonal etc.

Figure 11:
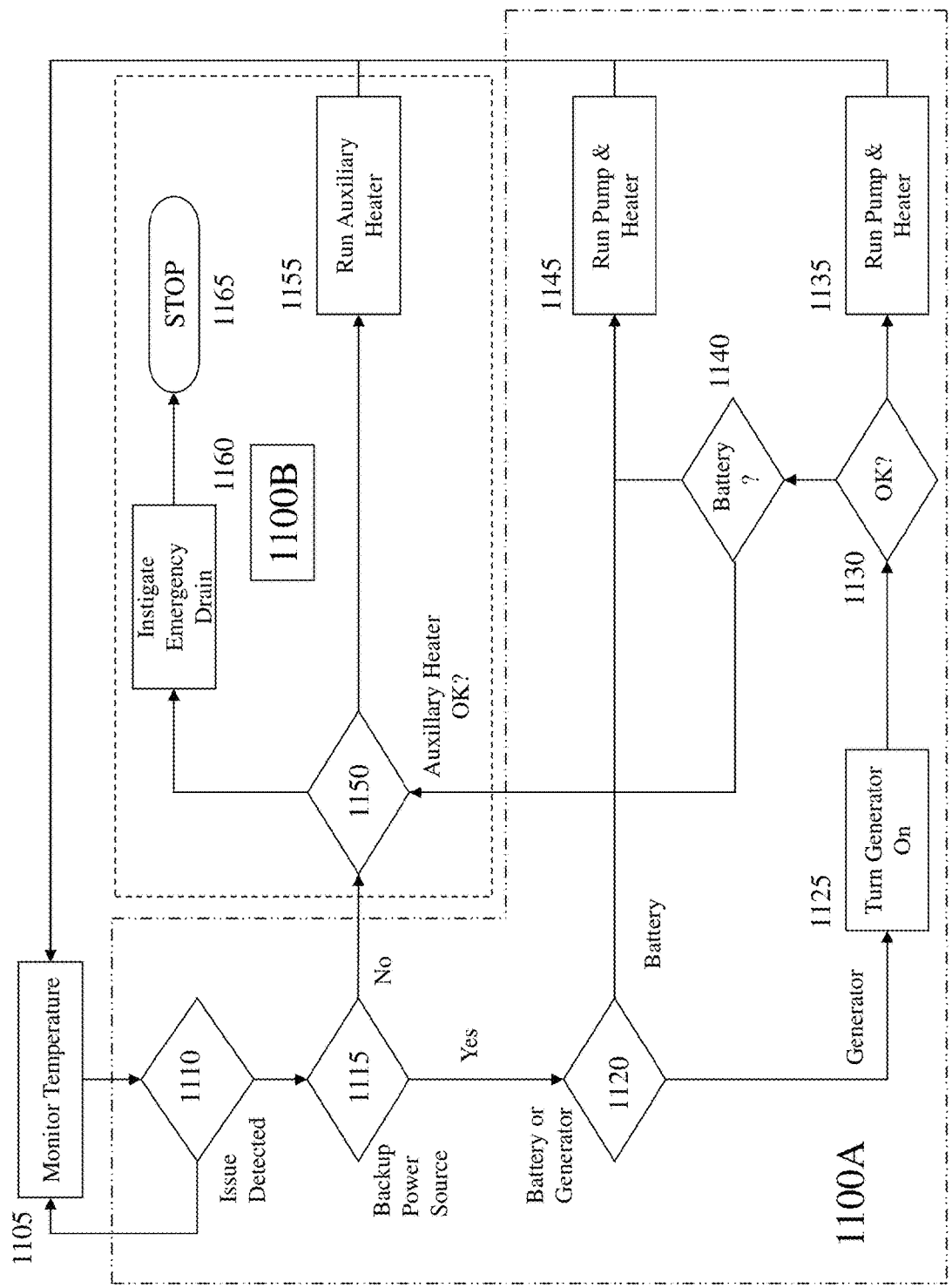
FIG. 11 depicts an exemplary flow diagram for a control system for managing power failure within a spa system according to an embodiment of the invention.

Now referring to FIG. 11 there is depicted an exemplary flow diagram for a control system for managing power failure within a spa system according to an embodiment of the invention. Accordingly, the process begins with step 1105 wherein the temperature is monitored, e.g., within the cavity of the spa system and/or of the water. At step 1110 a decision is made as to whether an issue has been detected such that the temperature monitored is now below a threshold temperature or temperature set-point wherein if the temperature is below the process proceeds to step 1115 otherwise it proceeds back to step 1105.

In step 1115 a decision is made in respect of whether a backup power supply exists for the first electric circuit wherein a positive determination results in the process proceeding to step 1120 and determining whether a generator or battery based backup exists. A determination of a generator results in the process proceeding to step 1125 and turning the generator one which if it starts OK is determined in step 1130 wherein successful start results in the heater and pump being run in step 1135 and the process looping back to step 1105 to monitor again.

If a problem exists, the generator option the process proceeds from step 1130 to step 1140 to determine whether a battery backup also exists. If not the process loops to step 1150 otherwise it proceeds to step 1145 and runs the pump—heater etc. from the battery backup. Step 1150 is also reached if the process in step 1115 determines that no backup power source exists to maintain full operation of the spa system in standby or sleep mode. Accordingly, in step 1150 a determination is made as to whether an auxiliary heater is installed wherein a positive determination results in the auxiliary heater being run and the process proceeding to step 1155. A determination that no auxiliary heater is connected leads the process to step 1160 and instigation of an emergency drain is undertaken prior to the process stopping at step 1165.

Within an embodiment of the invention an emergency drain protocol may be initiated when the temperature monitored by the backup system drops below a predetermined threshold set below that at which the backup system should trigger the heater such that in the event of as event such as failure of the heater, insufficient backup power being available for powering the heater, accidental disconnect of the heater sub-system, or even no heater. Within embodiments of the invention the emergency drain may be discrete from the active monitoring and be a passive mechanical device set to trigger below a predetermined temperature such that in the event of the temperature dropping below a predetermined threshold the spa is emptied automatically thereby preventing freezing. For example, the active system may be set to trigger at 10° C. whilst the passive emergency drain is set to 5° C.

Within an embodiment of the invention a first sub-process 1100A comprising steps 1110 to 1145 may be under control of the controller of the spa system, e.g., Controller 105 in FIG. 1, whilst a second sub-process 1100B comprising steps 1150 to 1165 may be controlled by a second controller. This second controller may, for example, be within the WES comprising the second electric circuit as a controller will typically be required to control the wireless and/or wired interface.

Figure 12:
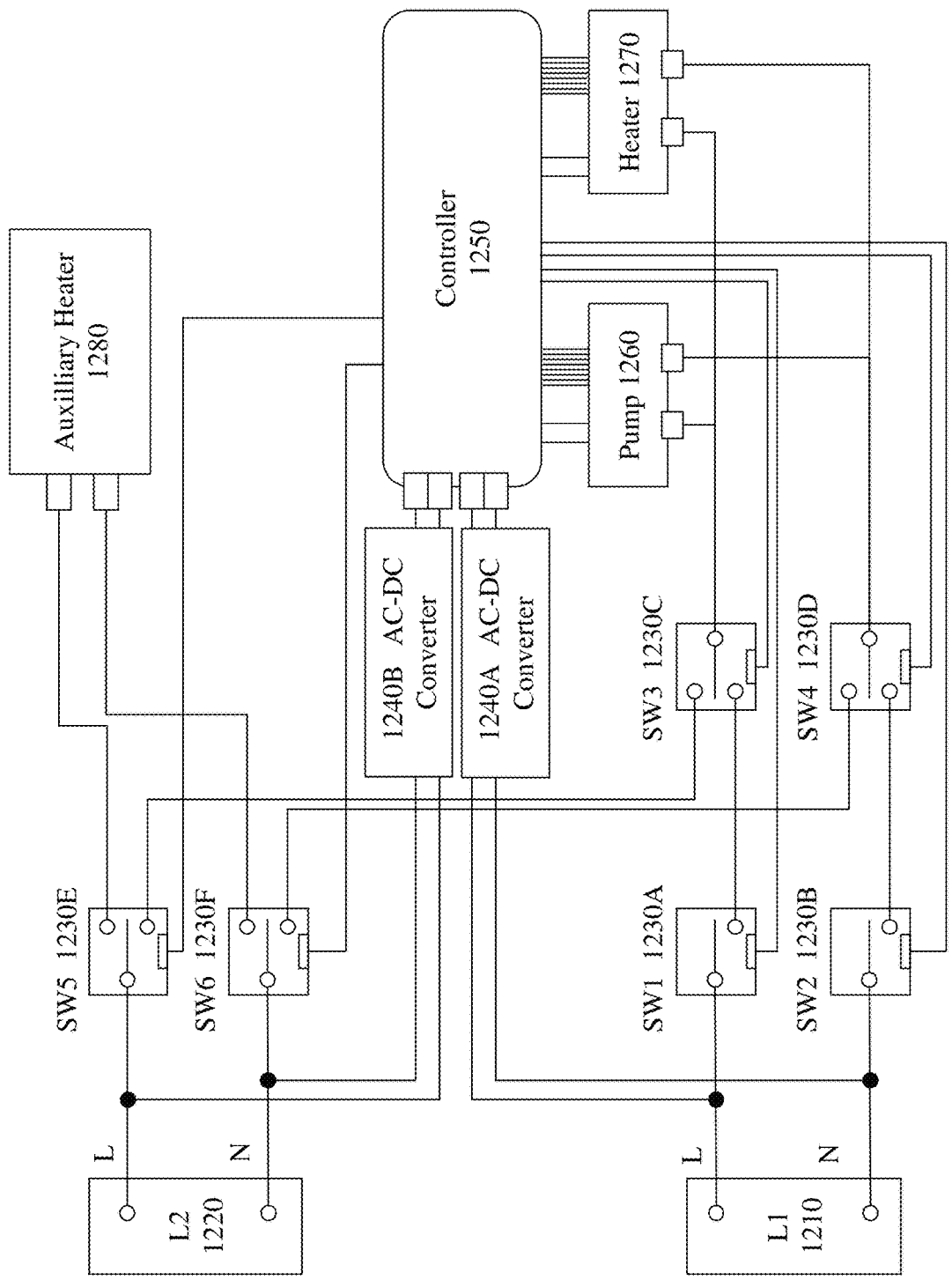
FIG. 12 depicts exemplary analog control configuration for a spa system according to an embodiment of the invention.

Within embodiments of the invention the first electric circuit and the second electric circuit have been described as being employed discretely for the main spa pack of pump and heater with respect to the first electric circuit and the auxiliary heater with respect to the second electric circuit. FIG. 12 depicts exemplary control configuration for a spa system according to an embodiment of the invention. As depicted a first line 1210 is connected to a first portion of the circuit wherein power is tapped and fed to a Controller 1250 via a first AC-DC Converter 1240A. The first line L1 1210 is also coupled to first and second switches, SW1 1230A and SW2 1230B, which are controlled by control lines from the Controller 1250. The outputs of first and second switches SW1 1230A and SW2 1230B are coupled to third and fourth switches, SW3 1230C and SW4 1230D respectively whilst a second line 1220 is connected to a second portion of the circuit comprising fifth and sixth switches SW5 1230E and SW6 1230F respectively. Each of the third to sixth switches SW3 to SW6 1230C to 1230F are coupled to the Controller 1250 via control lines. The Controller 1250 is also coupled to L2 1220 via a second AC-DC Converter 1240B.

Accordingly, in a first mode with power supplied from L1 1210 to the Controller 1250 the first and second switches SW1/SW2 1230A/1230B are driven to couple L1 1210 to the third and fourth switches SW3/SW4 1230C/1230D which are also switched to couple L1 1210 to the Pump 1260 and Heater 1270. In the event of a failure of L1 1210 the Controller 1250 detects this via monitoring the DC inputs from the first AC-DC Converter 1240A and now receives power from L2 1220 via second AC-DC Converter 1240B. As a result, the Controller 1250 adjusts the control signals for switches S3-S6 1230C to 1230F respectively such that L2 1220 is now coupled to the Pump 1260 and Heater 1270. If L2 1220 is a similar mains supply as L1 1210 then the spa system may continue to operate in all modes. If, however, L2 1220 is a lower capacity mains supply than L1 1210 then the Controller 1250 may only support some modes of operation of the spa system. This may be automatically detected by the Controller 1250 monitoring measuring the voltage from the second AC-DC converter 1240B. If the spa system had been set to a sleep/standby or winter protection mode prior to the failure of L1 1210 then it can maintain these modes as if nothing had happened. However, the Controller 1250 may now trigger a wired and/or wireless communication via the respective wired and/or wireless interfaces indicating the fault on L1 1210. Optionally, indicator lights on the spa system may also reflect this condition.

If the Controller 1250 detects a fault with one or other of the Pump 1260 and Heater 1270 then it may similarly trigger a communication relating to this fault or faults and default the controls to a sleep/standby or winter protection mode wherein the fifth and sixth switches SW5/SW6 1230E and 1230F are set to couple L2 1220 to the Auxiliary Heater 1280. Fifth and sixth switches SW5/SW6 1230E and 1230F may default to this configuration absent a control signal from the Controller 1260 so that in the event of an issue with the Controller 1250 the freeze protection is engaged automatically irrespective of prior setting(s). Further, through the thermostat control as described supra in respect of the Auxiliary Heater 1280 this will automatically turn on when the set-point temperature for freeze protection is reached.

Accordingly, the configuration depicted in FIG. 12 in contrast to the solution taught by Miller removes the requirement for an additional pump, heater, bypass valves and additional piping. The operation of the configuration in FIG. 12 supports multiple "back up" modes by virtue of supporting use of L2 1220 in conjunction with the standard spa pack (Pump 1260 and Heater 1270) or the Auxiliary Heater 1280. Provisioning of a battery backup module to the Controller 1250 may allow the Controller 1250 to send data to the wired and/or wireless interface within the WES through which L2 1220 is coupled.

Optionally, the wired and/or wireless interface may be in continuous communication with the Controller 1250 allowing a user to remotely access the current status of the spa system rather than solely receiving an alert or alarm. Optionally, the remote user through an application may control the spa system "disabling" it in the event of unauthorized operation by locking it into a sleep or standby mode, for example. Equally, a user may where bidirectional communications from a remote user with an application in execution upon an electronic device to/from the controller are supported turn the spa system on so that it is heating up prior to their arrival.

Within embodiments of the invention described and depicted in respect of FIGS. 5 to 12 the backup system(s) have been described from the perspective of monitoring the temperature of the fluid (e.g., water) to determine when to trigger the operation of the auxiliary heater. However, within other embodiments of the invention it may be that the temperature monitored and employed as basis for decision is that of a pipe or pipes carrying the circulating fluid (e.g., water) or alternatively it is the air within one or more cavities within the spa. Optionally, it may be multiple measurements and multiple measurands, e.g., pipe temperature and fluid temperature. For example, a temperature sensor may be taped to the outside of a pipe but inside any insulation applied to it, a temperature sensor may be taped to the outside of a pipe and outside any insulation applied to it, or a temperature sensor may be inserted through a manifold or sealed interface such that it is measuring the fluid (water) temperature. Optionally, temperature sensors may be formed within dedicated fitting for the system such as pipe interfaces such that the piping is joined to either side of the pipe interface which has a temperature sensor with it or coupled to a small metal plate molded into the body of the system in contact with the fluid (e.g., water).

Within embodiments of the invention described and depicted in respect of FIGS. 5 to 12 the backup system(s) have been described from the perspective of monitoring the temperature of the fluid (e.g., water) to determine when to trigger the operation of the auxiliary heater. However, within other embodiments of the invention the system may provide for an initial warming sequence of the spa system such that during an initial filling operation or refilling operation the surfaces of the spa system are warmed thereby preventing freezing or reducing the extent of freezing during the freezing operation and preventing operation of the spa system until the threshold temperature has been exceeded.

Optionally, within embodiments of the invention an electrical heater in the form of a tape, pad, or other geometry may be employed either in contact with a predetermined portion of the shell of the spa system (e.g., a region at the bottom of the spa system) or one or more pipes within the spa circulatory system.

Within other embodiments of the invention the temperature monitoring may be linked to a weather service allowing current temperatures and projected temperatures to factor into the decision to trigger. For example, a fluid temperature and pipe temperature below their respective temperatures with a weather forecast indicating temperatures have reached their minimum and are increasing may suspend triggering of the backup/protection system for a predetermined period of time. Alternatively, a fluid temperature and pipe temperature above their respective temperatures for triggering the system but below a second slightly higher threshold may where the weather forecast is indicating stable or lower temperatures then the backup/protection system may be triggered either at maximum output or a reduced output.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A system for freeze protection of a spa system comprising a spa tub, a fluidic circuit comprising a controller coupled to powered components of the spa system, and the powered components of the spa system which are coupled to a mains power interface powering the powered components of the spa system and a shell supporting the spa tub, the system comprising:
   a control unit coupled to a temperature sensor for enabling a heater not forming part of the powered components of the spa system when a reading from the temperature sensor received by the control unit indicates that the temperature of air within a cavity between the shell of the spa system and the spa tub has dropped below a predetermined threshold independent of a state of the fluidic circuit forming part of the spa system.

2. The system according to claim 1, wherein the heater and the control unit are coupled to another mains power interface; and the heater is within another cavity formed between the shell of the spa system and the spa tub and when enabled by the control unit heats air within the another cavity and therein at least one of the spa tub and piping forming part of the spa system within the another cavity.

3. The system according to claim 1, wherein the heater and the control unit are coupled to another mains power interface;

the heater is external to another cavity formed between the shell of the spa system and the spa tub and coupled to the another cavity via at least one of an opening within the shell of the spa system and ducting from the heater to the another cavity; and when enabled by the control unit heats air within the another cavity and therein at least one of the spa tub and piping forming part of the spa system within the another cavity.

4. The system according to claim 1, further comprising the heater which is selected from the group comprising a forced air heater, an electrical element heater, a wound tape electrical heater, a heat lamp, and an infrared heat lamp; and the heater is within another cavity formed between the shell of the spa system and the spa tub and when enabled by the control unit the heater heats at least one of:

air within the cavity and therein at least one of the spa tub and piping forming part of the spa system within the another cavity; and at least one of the spa tub and piping forming part of the spa system within the another cavity.

5. The system according to claim 1, wherein
the heater and the control unit are coupled to another mains power interface; and
the control unit provides either:
a control signal to the heater to turn on the heater when the temperature is below the predetermined threshold; or
mechanical switching to connect the another mains power interface to the heater when the temperature is below the predetermined threshold.

6. The system according to claim 1, wherein
the heater and the control unit are coupled to another mains power interface; and
the control unit comprises:
an outer case for mounting the control unit to the shell of the spa system;
an electrical interface for coupling to the another electrical mains to provide electrical power to the heater and the control unit; and
at least one of:
a visual indication means to display to a user at least one a status of the second mains power interface and a status of the heater; and
an interface supporting communications to a communications network for sending messages relating to at least one a status of the second mains power interface and a status of the heater to a remote user upon an electronic device also connected to the communications network.

7. The system according to claim 1, wherein
the heater and the control unit are coupled to another mains power interface; and
the another mains power interface provides electrical power to the heater and the control unit independent of a state of the controller of spa system and independent of a status of the electrical mains interface powering the powered components of the spa system.

8. The system according to claim 1, wherein
at least one of:
the control unit when the temperature monitored by the temperature sensor is below the predetermined threshold enables the heater and disables the normal spa fluidic circuit; and
the system further comprises one or more mechanical temperature dependent switches wherein the one or more mechanical temperature dependent switches disconnect electrical connections between the mains power interface and at least one of another heater forming part of the spa system, a pump forming part of the spa system, and a controller forming part of the spa system.

9. The system according to claim 1, further comprising at least one of:
another temperature sensor for enabling the heater not forming part of the powered components of the spa system when a reading from the another temperature sensor received by the control unit indicates that the temperature of water within the spa system has dropped below another predetermined threshold independent of a state of the fluidic circuit forming part of the spa system; and
a further temperature sensor for enabling the heater not forming part of the powered components of the spa system when a reading from the further temperature sensor received by the control unit indicates that the temperature of a pipe forming part of the spa system has dropped below a further predetermined threshold independent of a state of the fluidic circuit forming part of the spa system.

10. The system according to claim 1, wherein at least one of:
the control unit triggers the heater independent of the state of the controller forming part of the spa system to enable an initial warming sequence of the spa system to be established during an initial filling operation or refilling operation;
the control unit prevents operation of the spa system until the predetermined threshold temperature is exceeded;
the control unit obtains a weather forecast comprising a current temperature and projected temperatures from a weather service and employs these to modify the enabling of the heater by suspending enabling of the heater for a predetermined period of time if the weather forecast indicates that the current temperature has reached a minimum relative to the projected temperatures;
the control unit obtains a weather forecast comprising a current temperature and projected temperatures from a weather service and employs these to modify the enabling of the heater by
triggering the heater when the reading from the thermostat received by the control unit indicates that the temperature is below another predetermined threshold temperature higher than the predetermined threshold temperature and the weather forecast indicates either a stable temperature or lower temperatures where the heater operates at an output at or below the maximum output of the heater.

11. A method for preventing a spa system freezing where the spa system comprises a spa tub, a fluidic circuit comprising a controller coupled to powered components of the spa system, and the powered components of the spa system which are coupled to a mains power interface powering the powered components of the spa system and a shell supporting the spa tub, the system comprising:
providing a control unit coupled to a temperature sensor for enabling a heater not forming part of the powered components of the spa system when a reading from the temperature sensor received by the control unit indicates that the temperature of air within a cavity between the shell of the spa system and the spa tub has dropped below a predetermined threshold independent of a state of the fluidic circuit forming part of the spa system.

12. The method according to claim 11, wherein
the heater and the control unit are coupled to another mains power interface; and
the heater is disposed within another cavity formed between the shell of the spa system and the spa tub and when enabled by the control unit heats air within the another cavity and therein at least one of the spa tub and piping forming part of the spa system within the another cavity.

13. The method according to claim 11, wherein
the heater and the control unit are coupled to another mains power interface;
the heater is external to another cavity formed between the shell of the spa system and the spa tub and coupled to the another cavity via at least one of an opening within the shell of the spa system and ducting from the heater to the another cavity; and
when enabled by the control unit heats air within the another cavity and therein at least one of the spa tub and piping forming part of the spa system within the another cavity.

14. The method according to claim 11, further comprising
the heater which is selected from the group comprising a forced air heater, an electrical element heater, a wound tape electrical heater, a heat lamp, and an infrared heat lamp; and
the heater is within another cavity formed between the shell of the spa system and the spa tub and when enabled by the control unit the heater heats at least one of:
air within the cavity and therein at least one of the spa tub and piping forming part of the spa system within the another cavity; and
at least one of the spa tub and piping forming part of the spa system within the another cavity.

15. The method according to claim 11, wherein
the heater and the control unit are coupled to another mains power interface; and
the control unit provides either:
a control signal to the heater to turn on the heater when the temperature is below the predetermined threshold; or
mechanical switching to connect the another mains power interface to the heater when the temperature is below the predetermined threshold.

16. The method according to claim 11, wherein
the heater and the control unit are coupled to another mains power interface; and
the control unit comprises:
an outer case for mounting the control unit to the shell of the spa system;
an electrical interface for coupling to the another electrical mains to provide electrical power to the heater and the control unit; and
at least one of:
a visual indication means to display to a user at least one a status of the second mains power interface and a status of the heater; and
an interface supporting communications to a communications network for sending messages relating to at least one a status of the second mains power interface and a status of the heater to a remote user upon an electronic device also connected to the communications network.

17. The method according to claim 11, wherein
the heater and the control unit are coupled to another mains power interface; and
the another mains power interface provides electrical power to the heater and the control unit independent of a state of the controller of spa system and independent of a status of the electrical mains interface powering the powered components of the spa system.

18. The method according to claim 11, wherein
at least one of:
the control unit when the temperature monitored by the temperature sensor is below the predetermined threshold enables the heater and disables the normal spa fluidic circuit; and
the system further comprises one or more mechanical temperature dependent switches wherein the one or more mechanical temperature dependent switches disconnect electrical connections between the mains power interface and at least one of another heater forming part of the spa system, a pump forming part of the spa system, and a controller forming part of the spa system.

19. The method according to claim 11, further comprising providing at least one of:
another temperature sensor for enabling the heater not forming part of the powered components of the spa system when a reading from the another temperature sensor received by the control unit indicates that the temperature of water within the spa system has dropped below another predetermined threshold independent of a state of the fluidic circuit forming part of the spa system; and
a further temperature sensor for enabling the heater not forming part of the powered components of the spa system when a reading from the further temperature sensor received by the control unit indicates that the temperature of a pipe forming part of the spa system has dropped below a further predetermined threshold independent of a state of the fluidic circuit forming part of the spa system.

20. The method according to claim 11, wherein
at least one of:
the control unit triggers the heater independent of the state of the controller forming part of the spa system to enable an initial warming sequence of the spa system to be established during an initial filling operation or refilling operation;
the control unit prevents operation of the spa system until the predetermined threshold temperature is exceeded;
the control unit obtains a weather forecast comprising a current temperature and projected temperatures from a weather service and employs these to modify the enabling of the heater by suspending enabling of the heater for a predetermined period of time if the weather forecast indicates that the current temperature has reached a minimum relative to the projected temperatures;

the control unit obtains a weather forecast comprising a current temperature and projected temperatures from a weather service and employs these to modify the enabling of the heater by triggering the heater when the reading from the thermostat received by the control unit indicates that the temperature is below another predetermined threshold temperature higher than the predetermined threshold temperature and the weather forecast indicates either a stable temperature or lower temperatures where the heater operates at an output at or below the maximum output of the heater.

21. A system for freeze protection of a spa system comprising a spa tub, a fluidic circuit comprising a controller coupled to powered components of the spa system, and the powered components of the spa system which are coupled to a mains power interface powering the powered components of the spa system and a shell supporting the spa tub, the system comprising:

a control unit coupled to a temperature sensor for enabling a heater not forming part of the powered components of the spa system when a reading from the temperature sensor received by the control unit indicates that one of a temperature of air within a cavity between the shell of the spa system and the spa tub, a temperature of a pipe forming part of the spa system, and a temperature of water within the spa system has dropped below a predetermined threshold independent of a state of the fluidic circuit forming part of the spa system.

22. A method for preventing a spa system freezing where the spa system comprises a spa tub, a fluidic circuit comprising a controller coupled to powered components of the spa system, and the powered components of the spa system which are coupled to a mains power interface powering the powered components of the spa system and a shell supporting the spa tub, the system comprising:

providing a control unit coupled to a temperature sensor for enabling a heater not forming part of the powered components of the spa system when a reading from the temperature sensor received by the control unit indicates that one of a temperature of air within a cavity between the shell of the spa system and the spa tub, a temperature of a pipe forming part of the spa system, and a temperature of water within the spa system has dropped below a predetermined threshold independent of a state of the fluidic circuit forming part of the spa system.

\* \* \* \* \*